(12) United States Patent
Hadnagy

(10) Patent No.: US 9,635,052 B2
(45) Date of Patent: Apr. 25, 2017

(54) PHISHING AS-A-SERVICE (PHAAS) USED TO INCREASE CORPORATE SECURITY AWARENESS

(71) Applicant: Christopher J. Hadnagy, Brooklyn, PA (US)

(72) Inventor: Christopher J. Hadnagy, Brooklyn, PA (US)

(73) Assignee: Christopher J. Hadnagy, Brooklyn, PA (US)

( * ) Notice: Subject to any disclaimer, the term of this patent is extended or adjusted under 35 U.S.C. 154(b) by 73 days.

(21) Appl. No.: 14/704,148

(22) Filed: May 5, 2015

(65) Prior Publication Data

US 2016/0330238 A1    Nov. 10, 2016

(51) Int. Cl.
  *H04L 29/06*    (2006.01)
  *H04L 12/58*    (2006.01)

(52) U.S. Cl.
  CPC .......... *H04L 63/1483* (2013.01); *H04L 51/22* (2013.01); *H04L 63/1408* (2013.01)

(58) Field of Classification Search
  CPC .. H04L 63/1483; H04L 51/22; H04L 63/1408
  USPC ........................................................ 726/22
  See application file for complete search history.

(56) References Cited

U.S. PATENT DOCUMENTS

| | | | | |
|---|---|---|---|---|
| 8,434,148 B2 * | 4/2013 | Teo | ...................... | G06F 21/566 |
| | | | | 713/168 |
| 8,484,741 B1 * | 7/2013 | Chapman | ........... | G06Q 10/0635 |
| | | | | 709/206 |
| 8,615,807 B1 * | 12/2013 | Higbee | ................ | G06Q 10/107 |
| | | | | 726/22 |
| 8,635,703 B1 * | 1/2014 | Belani | ................. | H04L 63/1433 |
| | | | | 726/22 |
| 8,719,940 B1 * | 5/2014 | Higbee | ............... | H04L 63/1408 |
| | | | | 709/206 |

(Continued)

OTHER PUBLICATIONS

Meijdam et al., Phishing as a Service: Designing an ethical way of mimicking targeted phishing attacks to train employees, ACM, 2010.*

(Continued)

*Primary Examiner* — David Garcia Cervetti
(74) *Attorney, Agent, or Firm* — Landmark Intellectual Property Law, PLLC

(57) ABSTRACT

An enhanced system is provided through a network such as the Internet that provides integrated network security (phishing) testing and training. The current system increases corporate security of users that can receive and send electronic messages in an entity, by creating and storing a set of phish messages, each classified by a difficulty level. The electronic addresses of the users are acquired and stored. A current difficulty level is set for all users to an initial level. A phish message of the current difficulty level for a given user is selected and sent to the user. The system monitors if the user clicks on or reports the phish message. If the user does not click on the phish message and reports it, the user's current level is increased up to a maximum level. Those that do not pass the test are provided on-line education. The above steps are repeated for all users until the testing is completed providing targeted phishing education to those which need it most.

20 Claims, 2 Drawing Sheets

(56) References Cited

U.S. PATENT DOCUMENTS

| | | | | |
|---|---|---|---|---|
| 8,793,799 | B2* | 7/2014 | Fritzson | G06F 21/577 709/206 |
| 8,875,284 | B1* | 10/2014 | Newstadt | H04L 63/1425 726/22 |
| 8,910,287 | B1* | 12/2014 | Belani | H04L 63/1483 726/23 |
| 8,943,588 | B1* | 1/2015 | Speegle | H04L 63/1483 726/22 |
| 9,112,897 | B2* | 8/2015 | Teo | G06F 21/566 |
| 9,224,117 | B2* | 12/2015 | Chapman | G06Q 10/0635 |
| 9,246,936 | B1* | 1/2016 | Belani | H04L 63/1433 |
| 9,253,207 | B2* | 2/2016 | Higbee | H04L 63/1475 |
| 9,262,629 | B2* | 2/2016 | Belani | H04L 63/1483 |
| 9,270,696 | B2* | 2/2016 | Fritzson | G06F 21/577 |
| 9,275,215 | B2* | 3/2016 | Bailey | G06F 21/36 |
| 9,280,911 | B2* | 3/2016 | Sadeh-Koniecpol | G09B 5/00 |
| 9,325,730 | B2* | 4/2016 | Higbee | H04L 63/1416 |
| 9,356,948 | B2* | 5/2016 | Higbee | H04L 63/1416 |
| 9,373,267 | B2* | 6/2016 | Sadeh-Koniecpol | G09B 5/00 |
| 9,398,029 | B2* | 7/2016 | Sadeh-Koniecpol | H04L 63/14 |
| 9,398,038 | B2* | 7/2016 | Higbee | H04L 63/1425 |
| 2003/0211449 | A1* | 11/2003 | Seiller | G09B 19/0038 434/258 |
| 2007/0234061 | A1* | 10/2007 | Teo | G06F 21/566 713/178 |
| 2009/0037976 | A1* | 2/2009 | Teo | G06F 21/566 726/1 |
| 2009/0044266 | A1* | 2/2009 | Sharp | G06F 21/566 726/14 |
| 2009/0064325 | A1* | 3/2009 | Ford | H04L 63/1483 726/22 |
| 2009/0144308 | A1* | 6/2009 | Huie | H04L 63/1483 |
| 2009/0327168 | A1* | 12/2009 | Weinberger | H04L 12/585 706/11 |
| 2010/0211641 | A1* | 8/2010 | Yih | G06F 15/16 709/206 |
| 2011/0099607 | A1* | 4/2011 | Cohen | H04L 12/58 726/3 |
| 2011/0209222 | A1* | 8/2011 | Sharp | G06F 21/566 726/26 |
| 2012/0090446 | A1* | 4/2012 | Moreno | G09B 15/00 84/470 R |
| 2012/0124671 | A1* | 5/2012 | Fritzson | G06F 21/577 726/26 |
| 2013/0034837 | A1* | 2/2013 | Clapp | G09B 5/06 434/247 |
| 2013/0198846 | A1* | 8/2013 | Chapman | G06Q 10/0635 726/25 |
| 2013/0297375 | A1* | 11/2013 | Chapman | G06Q 10/0635 705/7.28 |
| 2013/0330693 | A1* | 12/2013 | Sada | G09B 5/06 434/236 |
| 2014/0272905 | A1* | 9/2014 | Boersma | G09B 7/04 434/362 |
| 2014/0337995 | A1* | 11/2014 | Fritzson | G06F 21/577 726/26 |
| 2014/0356838 | A1* | 12/2014 | Freimuth | G09B 7/02 434/348 |
| 2015/0089642 | A1* | 3/2015 | Di Cocco | G06F 21/36 726/22 |
| 2015/0229664 | A1* | 8/2015 | Hawthorn | H04L 63/1408 726/25 |
| 2015/0287336 | A1* | 10/2015 | Scheeres | G09B 19/0053 434/156 |
| 2016/0036821 | A1* | 2/2016 | Vandemar | H04L 63/102 726/4 |
| 2016/0078377 | A1* | 3/2016 | Chapman | G06Q 10/0635 705/7.28 |
| 2016/0156656 | A1* | 6/2016 | Boggs | H04L 63/1433 726/25 |
| 2016/0180248 | A1* | 6/2016 | Regan | G06N 5/04 706/12 |
| 2016/0330238 | A1* | 11/2016 | Hadnagy | H04L 51/22 |

OTHER PUBLICATIONS

Kumaraguru et al., Getting Users to Pay Attention to Anti-Phishing Education: Evaluation of Retention and Transfer, APWG, Oct. 2007.*

Cole et al., Design a Mobile Game for Home Computer Users to Prevent from "Phishing Attacks", IEEE, 2011.*

"Phishing Dark Waters: The Offensive and Defensive Sides of Malicious Emails", Paperback—Apr. 6, 2015 by Christopher Hadnagy, Michele Fincher, Robing Dreeke (Available on Amazon. com.).

* cited by examiner

PHISHING AS-A-SERVICE (PHAAS) USED TO INCREASE CORPORATE SECURITY AWARENESS

CROSS-REFERENCE TO RELATED APPLICATIONS

Not Applicable.

STATEMENT REGARDING FEDERALLY SPONSORED RESEARCH

Not Applicable.

BACKGROUND

1. Field of Invention

The present invention relates to training and services relating to corporate security and more specifically to training and services relating to compromising corporate information security by opening electronic messages and either clicking on a malicious link or attachment.

2. Description of Related Art

Network Security—Generally

Since most computers, smart phones, tablets, and other computing devices are typically connected to a network and/or the Internet, there is a risk that the corporate network may be compromised and information stolen by those gaining unauthorized access to the computing devices who may be referred to as "malicious hackers".

In response, there are many hardware and software products protecting the computing devices such as firewalls and virus protection software. Much of this hardware/software has become quite sophisticated. Other means to gain access to the computing devices besides a direct technical attack are now becoming more popular.

Exceptions are typically made to allow mail and other electronic messages to pass through the firewall. A possible attack method or attack vector is to insert a link to a malicious website or to hide malicious software ("malware") in these electronic messages. Once inside the firewall, the malware can be activated and perform malicious activities inside of the firewall. These are referred to as "incidents". Malicious activities may include logging keystrokes and sending them back to the hacker, releasing a virus into the system, taking control of your computer making it a part of a network to attack other systems, encrypting your hard drive and asking for a ransom to unlock it, and other malicious acts. All of these can cause significant damage and incur large costs to recover data and put the system back into its original state.

The malicious software is typically inadvertently activated by the user by clicking on an attachment or link within the message. Since users typically do not click on or activate messages which they do not believe apply to them, the user must be 'tricked' into clicking on the message.

A malicious hacker intending to gain access to computing devices typically sends messages with malicious software to numerous users and then waits for a 'bite', just like fishing. This type of attack is commonly called "phishing". Even if only a small percentage of messages are clicked, this gives the attacker access to many computing devices. Therefore, the network and firewall are typically not the problem. The user is now the weak link in the system.

User Training

Corporate information security training is effective in teaching users how to recognize phishing messages and to refrain from clicking on these messages, thereby reducing the number of incidents. Users are also taught to report phishing messages. Reporting alerts a system administrator to the presence of the phishing messages and allows the system administrator to quarantine the phishing message, notify the users of the phishing message, and give the users instructions on how to proceed.

Extensive training of all users can be effective. Lack of training or improper training can make the network vulnerable to attacks and give the users a false sense of security.

There have been attempts to test a company's vulnerability to phishing by a legitimate penetration testing vendor. This was a simple process of sending a phishing message to various users in a company and monitoring if they clicked on the message. This only provided information on click rates, no determination or indication of how difficult it was to identify that the message was not authentic, and was therefore not a true test of an organization's security stance.

Another method worked in a similar fashion, except that it sent a first phishing message then followed up with a second phishing message that referred to the first phishing message. Again, there was no determination or indication of a difficulty level indicating how difficult it was to identify that either message was a phishing message or was authentic.

Besides the shortcomings listed above, the prior methods of testing for phishing or providing security and phishing education were stand-alone programs.

Currently, there is a need to provide an improved process for including phishing as part of a comprehensive security awareness program to increase security and reduce the incidents due to phishing that is easy to implement.

BRIEF DESCRIPTION OF THE DRAWINGS

The advantages of the system described in this application will become more apparent when read with the exemplary embodiment described specification and shown in the drawings. Further, in the accompanying drawings and description that follow, like parts are indicated throughout the drawings and description with the same reference numerals, respectively. The figures may not be drawn to scale and the proportions of certain parts have been exaggerated for convenience of illustration.

SUMMARY

Figure 1:
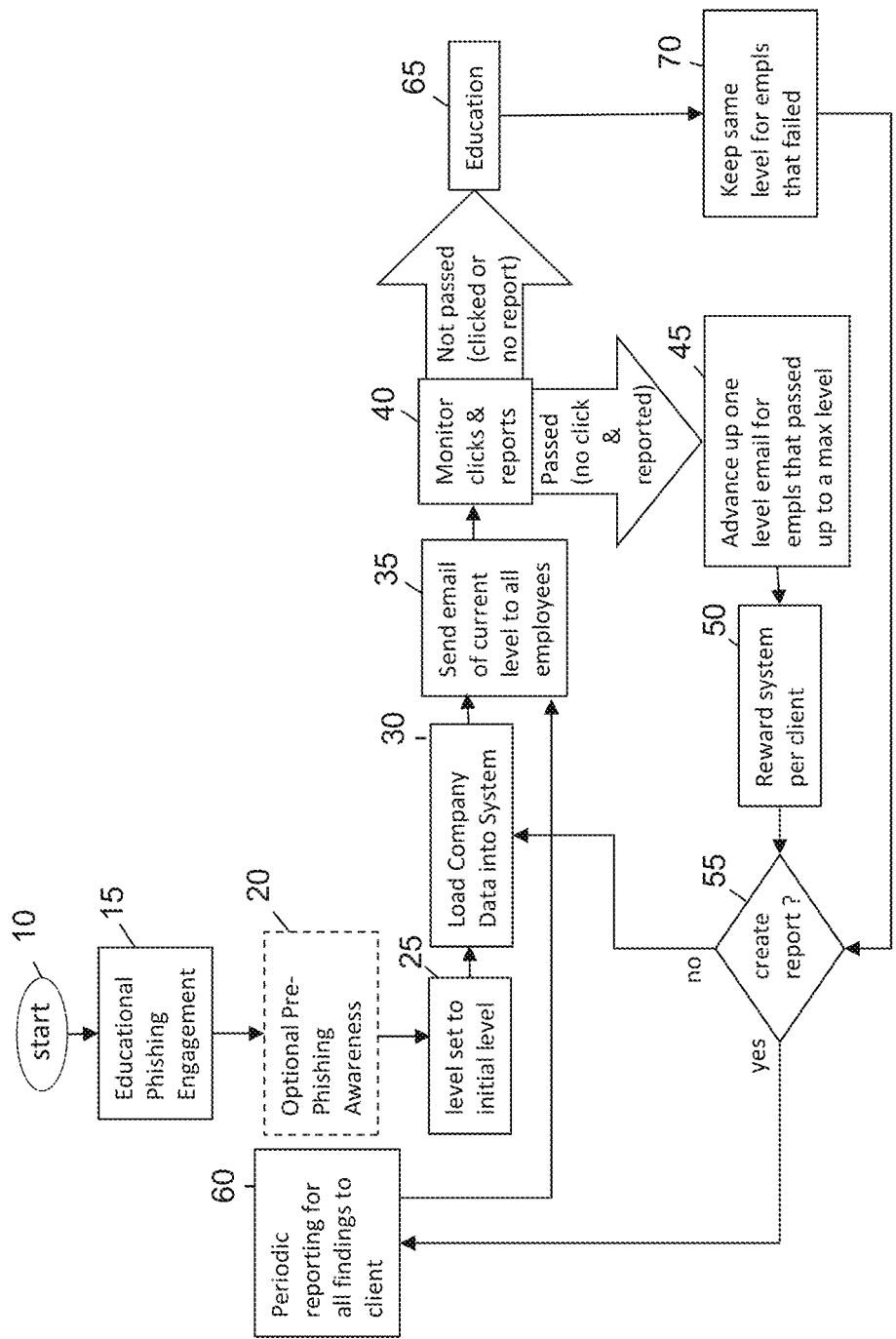
FIG. 1 is a flowchart generally indicating the steps of one embodiment of the present invention.

The current invention may be embodied as an improved or enhanced method for increasing corporate information security of an entity having at least one user capable of receiving electronic messages. It includes the steps of creating a plurality of phishing messages classified by a difficulty level, acquiring message address for at least one user identified to be tested, assigning an initial level to the user, and selecting a phishing message of the current level assigned to the user. The phishing message is then transmitted to the identified user's address. Each user is monitored to determine if they clicked on the phishing message or reported the phishing message. The current level is increased for those users that "pass", which are those users who reported it properly and did not click on the phishing message.

For those users that clicked on the phishing message or did not report the phishing message, they will be provided with phishing and security training.

If a report is due, one is provided covering the users and levels. The above steps are repeated until the testing is terminated, thereby identifying those needing education and providing phishing and security education to those users that need it most.

DETAILED DESCRIPTION

The present invention will now be described in detail by describing various illustrative, non-limiting embodiments thereof with reference to the accompanying drawings. The invention may, however, be embodied in many different forms and should not be construed as being limited to the illustrative embodiments set forth herein. Rather, the embodiments are provided so that this disclosure will be thorough and will fully convey the concept of the invention to those skilled in the art. The claims should be consulted to ascertain the true scope of the invention.

1. Theory

It has been determined that one of the major corporate security problems typically is not 'holes' in the hardware or software, but human errors in decision making, exemplified by users clicking on phishing messages which execute malicious software, handing over credentials, or visiting dangerous websites. It was determined that phishing incidents are a major problem and a security threat.

a) Training is Effective

It has been shown that training users on recognizing phish and how phishing incidents breach the security of the network is effective. It has also been shown that this type of training reduces phishing incidents. In order to decrease the risk a company has to this attack vector, all users should be trained at the same time.

b) User Discrimination Varies

People do not have an inherent ability to distinguish between phishing emails and emails which are authentic. Some people may have more of this ability than others, but all can be trained. Some users are tricked into clicking on the links in the phishing messages. It is useful to identify these users and provide training to them.

c) Categorizing Messages

In order to identify which users need training, there must be repeatable and standard criteria or processes. The users are classified by sending simulated phishing messages and each of their reactions is monitored. Some messages are more believable than others. In one embodiment of the current invention, these phishing messages are each classified by levels having the characteristics as indicated below.

Level 1
Impersonal greeting and closing
Misspelling/bad grammar
Easy message/improbable pretext (e.g., you've inherited millions)
Based on greed, fear, or curiosity
Bad URL links in the text
Bad origin email address/unknown sender Level 2
Impersonal greeting and closing
Spelled properly with some bad grammar
Messaging more complex but still basic
Uses greed, fear or curiosity
Bad URL links in the text
Bad origin email address/unknown sender Level 3
Personalized greeting and closing
Spelled properly
Generally good grammar
Complex message based on fear or curiosity
Bad URL links in the text
Sometimes bad origin email address, but sender can appear legitimate
Branding in many cases Branding adds a level of credibility, but can be seen with phish that are poorly written as well. In this case, consider the other indicators to categorize appropriately.

Mini levels within 3
External—the message originated from a sender outside the company;
Internal—the message originated from a sender inside the company; and
Emotionally Sensitive—the message takes advantage of particularly sensitive topics.

Level 3 may be further subdivided based upon these criteria. For example, if the phishing message originated from outside the user's entity, this may be assigned a level 3.1. A phishing message that originates from inside of the user's entity could be assigned a category of 3.2. A phishing message which can be determined to be emotionally sensitive can be given a level of 3.3.

Examples of the "Emotionally Sensitive" mini level are phishing messages that were sent after the Boston Marathon Bombing or an appeal to assist a dying child. Even though these are classified, these are rarely used in a corporate phishing program due to the sensitivity of the topics.

Level 4-Spear Phish

Spear phishing uses very personal information that is very specific to the user. For example, publicly available information may be incorporated into the messages making them look authentic and are difficult to discern from actual messages. Because of the time and effort necessary to craft an effective spear phish, these are typically reserved for individuals that are either higher in the corporate management chain or those who have access to corporate resources (e.g., network administrators).

The use of personal information requires some discussion. Each time a user receives a message, the user goes through a determination if this message is intended for them. What matters is the user's perception of the probability that the message is intended for them, not the actual probability.

Adding additional pieces of information that apply to the user increases the user's perception that the message is intended for the user.

Level 4 which includes personal information of the user causes many users to click on phishing messages. What the user fails to realize is that much of this information is available to the public. There are public records which indicate personal information of house purchases, addresses, telephone numbers, lawsuits, etc. The users also publish birthdates, pictures, and volumes of other personal information on social media outlets to include Facebook, Twitter, LinkedIn, Instagram, etc.

Therefore, as indicated above, greeting type, spelling, grammar, email address of sender, message content, and use of personal information are parameters used to create phish messages of varying levels of difficulty. The higher the level, the more authentic the message appears.

2. Application of the Theory

Below are the general steps of putting the theory to practice. Before there is testing, there is a setup phase.

a) SETUP

FIG. 1 shows an overall block diagram of one embodiment of the phishing process of the present invention.

The process starts at step 10. In block 15, an administrator of the testing, referred to as the "test administrator", speaks with the management of a company and gets the proper approvals to set up and run phishing testing on the company's employees, which will be referred to as "users".

Optionally, in block 20, there is some education provided on the phishing testing to the management and/or the users. This may involve being able to identify phish, the problems that clicking on phish emails can cause, reporting procedures, or similar subject matter.

In block 25, a current difficulty level is set to an initial level. For example, this may be level one.

Phishing messages are acquired and modified, or created with differing degrees of difficulty. In a first method, existing messages are modified to put them in a certain difficulty level.

It was found to be easier to take an actual message and introduce errors in the message to give it a specified difficulty level than creating entirely new messages. These are modified according to the phishing message levels above to give them a desired difficulty level.

Phishing messages may also be created from scratch, each with a specified difficulty level.

b) Testing

As indicated in the "Setup" phase above, phishing messages are created with each having a different difficulty level based upon the "levels" indicated above. In block 30, the information about the company and its users is entered into the system. This will include the email addresses of each of the users to be tested. The phishing messages that have been created/acquired and their associated levels are also stored in the system.

This email is sent to all of the users that are being tested in block 35. Each user that receives a phishing message is monitored to verify if they click on the phishing message. This may be done by connecting the phishing message link with a device which can monitor incoming messages and the sender.

The users may have also been previously instructed to identify "suspicious" messages they receive to a company user, such as their internal IT department.

In block 40, the system is preconfigured to allow the test administrator to know when users send a report of one of the phishing messages indicating that this is a "suspicious" email.

The best result is for a user to not click on a phishing email and report it as a suspicious email, which would lead to block 45 of the block diagram of FIG. 1. In this case, the user has passed the phishing test for this level of difficulty. Information regarding the phishing message and message level which the user passed may be stored in the system for this user.

In block 45 the level is increased for all of those users that had successfully passed the previous test. In the example above, they increase to level 2 which is also stored for each user in the system.

The user is also provided with a small reward or recognition for passing the phish test in block 50 per individual client.

Processing continues at block 55. In block 55 it is determined if it is time to create a report. If "yes", then a periodic report (weekly, monthly, quarterly) may be created in block 60. The report may also be generated upon request.

In the case where the user either clicks on the phishing message or does not report it to the IT department the process leads to block 65 in which education is provided to the user. This education may be in the form of a web page, video instruction, on-line seminars or other means of educating the user that (s)he had either clicked on a phishing message which could have compromised the entire system, or failed to report a phishing message that others may have clicked on also causing problems.

In block 70, the current difficulty level of the phishing message is kept at the same level, since the user did not pass with respect to this difficulty level. There will be at least another phishing message sent to this user of this difficulty level.

If a report is due, all findings are reported to the client in block 60. This report will have information and a format as requested by/negotiated with the company/client in block 15. The report may include the phishing messages sent, the users who received them, the users who passed, those who did not pass, education provided, current level of each user, summaries of those users having the lowest/highest levels, users failing/passing the most tests, statistical distributions, or other information which the company would find helpful.

If no report is required at this time, processing continues at block 30, in which additional company information may be loaded/updated/replaced.

The process then continues in block 35. In block 35, each user has a current difficulty level stored in the system (updated in block 35). A phishing message of the current difficulty level for each user is selected and sent to the user.

In block 40, each user is monitored to determine if they click on a phishing message or report it.

After several iterations through this process, the users have differing levels, and therefore phishing messages of differing levels are being sent to the users. At any point, a snapshot can indicate how many users are at each level, and the amount of education provided to each user. These and other data points may be used to determine other actions to be performed.

Figure 2:
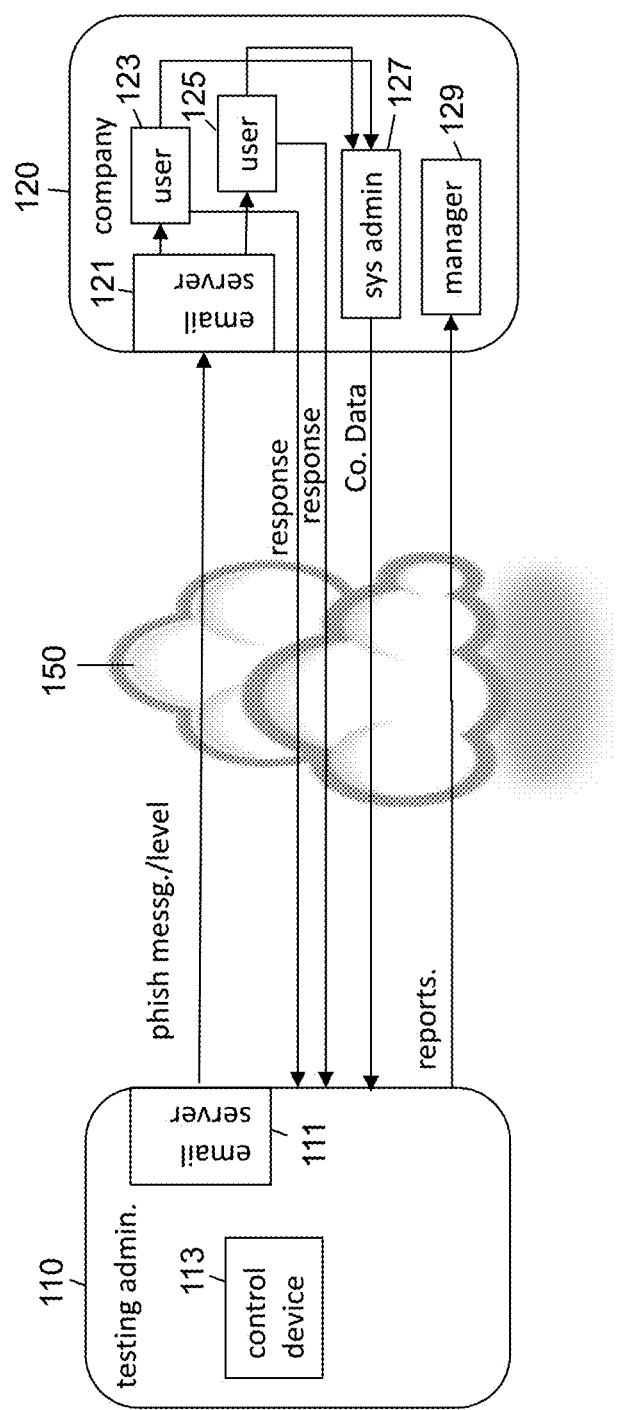
FIG. 2 is a general schematic block diagram of one embodiment of a system compatible with the method of the present invention.

FIG. 2 shows a general diagram of the major elements used to perform the process of FIG. 1.

A testing system 110 has an email server 111 capable of communicating with other computing devices via email. It also has a control device 113 which controls the functioning of the testing system 110. The testing system 110 is capable of acquiring and categorizing messages according to difficulty level. It is also capable of modifying existing messages to modify them to cause them to be in a desired difficulty level.

The testing system 110 also is capable of storing an identification of a user and the user's current difficulty level. Initially this is set to an initial level, as indicated in FIG. 1, block 25.

The control device can request Company Data from the company system 120. A system administrator 127 of company system 120 sends the company data which includes electronic message addresses for users at the company intended to be tested to testing system 110 which stores the information.

The control device 113 then identifies a user, such as user 123 of company system 120, the electronic addresses and current difficulty level for user 123, and selects a pre-stored phish message of the same current difficulty level. This phish is then sent through the email server 111 through the network 150 to user 123.

User 123 may click on a link in the phish and send a response which is detected by the testing system 110. Alternatively, user 123 may not click on the phish which is also detected by testing device 110.

User 123 may also report the suspicious "phish" that it received to a system administrator 127. During the initial configuration of the systems, it is determined that the system administrator 127 will report back to the testing system 110 if the users report receiving phish messages. Therefore, the testing system 110 will also know which users report which phishes shortly after the system administrator received each report.

Knowing if user 123 did not click on the phish message and reported it, causes the user 123 to pass the test, as indicated in FIG. 1, blocks 45 and 50. The current difficulty level is now advanced and stored for the user 123. The user is also rewarded per client.

If user 123 either clicked on the phishing message or did not report the phishing message, then user 123 fails and is provided educational information and training.

The same process is then performed for user 125, and the difficulty rating will increase if user 125 passes but does not increase if user 125 fails.

Phishing as a Service

One of the main unique aspects of this service is how the process of graduating users to certain levels is implemented. Although all set up and correspondence is done as normal phishing services are done, it is one of the first programs to create phishing levels that follow a path to educate the user in increasing difficulty.

Another valuable aspect of the system that was mentioned above is that the training is integrated into the phishing vulnerability system. Preferably, a reward is provided immediately after a user correctly responds to a phish message and training is provided immediately after a user incorrectly responds to a phish message. This positive/negative reinforcement is close in time to the actual event, making it very effective.

The training can be tailored to educate each user on the exact type of phishing message that tricked them. For example, training could be provided on misspellings, incorrect grammar, impersonal greetings, etc.

In an embodiment of the current invention, the system monitors the user's current difficulty level and reports on the user's level, the user's level over time, and the training completed by the user. The user is more apt to complete the training since it is automatically provided to the user. This is contrasted to previous systems in which the user would have to start up a training system, find the correct module and lesson and view the training, then return to the original systems the user was using when the phish message arrived.

Since the system is provided in a transparent fashion and integrated into the user's workday, the users are unaware that they are being tested. As the user is working, the phishing testing will be performed and based upon the response of the user, phishing security training may also be provided. Therefore, both the testing and training are integrated into the users' workday which are provided remotely through the Internet.

In an alternative embodiment of the current invention, the current level of a user or group of users can be monitored and reported. The current level for a user also can be graphed over time. This will show trends of users increasing current difficulty level for those who are learning from the training. It can also show you how quickly they are learning by the steepness of the incline (change in difficulty level over time). It will also show those that are learning more slowly, those that are not learning and keeping the same level, and those that are actually getting worse (decreasing their level). These can be added to the reports, or used to make additional adjustments. For example, users who are either not applying the education provided or seeming to fall back in their ability to detect phishing emails may be studied or contacted to determine why the learning is less effective on them. Also, alternative or more extensive learning programs may be implemented for these users.

In the embodiment described and shown in FIGS. 1 and 2, for each employee, the difficulty levels of the phishing messages received start at an initial level, which is possibly the lowest level, and increase upward to the highest level. As the user passes a test by not clicking and reporting a phishing message of a given level, the level is increased, but will not go above a maximum difficulty level.

The current invention may be embodied in other ways. For example, determining if a user passes a level may be based upon the results of more than one phish message. For example, passing to the next level could mean correctly responding to:

a) 2 or more phishing messages of the same difficulty level;

b) 2 consecutive phishing messages of the same difficulty level;

c) Getting higher than a specified percentage of a number of phishing messages having the same difficulty level, etc.

In another alternative embodiment of the current invention, the phishing messages do not have to start with a low level then increase to a higher level, but can be phishing messages that start at a higher level, but will generally not decrease in a level after the campaign starts. The results of a user's response to all of the phish messages sent to the users are analyzed to determine the current knowledge level of the user. Therefore, a user may have correctly responded to all phish messages of levels 1-2, 75% of phish messages of level 3 and had incorrectly responded to all phish messages having higher difficulty levels. In this case, a determination is made if the user is at level 2 or level 3. This determination may be made at the beginning of the project based upon the policies of the company.

While the present disclosure illustrates various aspects of the present teachings, and while these aspects have been described in some detail, it is not the intention of the applicant to restrict or in any way limit the scope of the claimed systems and methods to such detail. Additional advantages and modifications will readily appear to those skilled in the art. Therefore, the teachings of the present application, in its broader aspects, are not limited to the specific details and illustrative examples shown and described. Accordingly, departures may be made from such details without departing from the spirit or scope of the teachings of the present application. Moreover, the foregoing aspects are illustrative, and no single feature or element essential to all possible combinations may be claimed in this or a later application.

What is claimed is:

1. An enhanced method for increasing corporate security of an entity having at least one user capable of receiving electronic messages, comprising the steps of:
   a. creating a plurality of phish messages classified by a difficulty level;
   b. acquiring a message address for at least one user identified to be tested;
   c. assigning a level from a plurality of difficulty levels to the identified user, based on identification of the user;

d. selecting a phish message of the current difficulty level assigned to the identified user;
e. transmitting the selected phish message to the identified user's address;
f. monitoring the identified user to determine if the identified user clicked on the phish message;
g. monitoring the identified user to determine if the identified user reported the phish message;
h. increasing the difficulty level for the identified user if the user did not click on the phish message, and the identified user reported the phish message;
i. creating and providing a report of the users and levels, if one is due; and
j. repeating steps "d" through "i" for a plurality of repetitions.

2. The enhanced method of claim 1 further comprising the step of:
a. providing phishing and security education to a user each time that user clicked on the phish message; and
b. providing phishing and security education to a user each time that user failed to report a phish message the user received.

3. The enhanced method of claim 1 wherein the difficulty levels of phish messages are determined by at least one of:
a. impersonal versus personal greetings and closings;
b. misspelling;
c. incorrect grammar;
d. improbable pretext;
e. incorrect links in the body of the phish message;
f. incorrect origin email address; and
g. unknown sender name.

4. The enhanced method of claim 1 wherein the difficulty levels of phish messages are determined by message content relating to at least one of:
a. relates to greed;
b. relates to fear; or
c. relates to curiosity.

5. The enhanced method of claim 1 wherein the difficulty levels of phish messages are determined by the appearance of at least one of:
a. logo;
b. trademark;
c. company name; and
d. other branding used in the phish message.

6. The enhanced method of claim 1 wherein the reports include information on the current difficulty level for a plurality of users.

7. The enhanced method of claim 1 wherein the reports include information of the current difficulty level for a plurality of users over time showing trends.

8. The enhanced method of claim 1 wherein the reports are created and provided at regular time intervals, wherein the intervals are one of the group consisting of: daily, weekly, monthly, quarterly, semi-annual, and annual intervals.

9. An on-line service for increasing corporate security of an entity having at least one user capable of receiving electronic messages, the on-line service remotely conducting steps utilizing a computer program embodied on non-transitory computer readable media, the steps comprising:
a. creating a plurality of phish messages classified by a difficulty level;
b. acquiring a message address for at least one user identified to be tested;
c. assigning a level from a plurality of difficulty levels to the identified user, based on identification of the user;
d. selecting a phish message of the current difficulty level assigned to the identified user;
e. transmitting the selected phish message to the identified user's address;
f. monitoring the identified user to determine if the identified user clicked on the phish message;
g. monitoring the identified user to determine if the identified user reported the phish message;
h. increasing the level for the identified user if this user did not click on the phish message, and the identified user reported the phish message;
i. creating and providing a report of the users and levels, if one is due; and
j. repeating steps "d" through "i" for a plurality of repetitions.

10. The on-line service of claim 9 further comprising the step of:
a. providing phishing and security education to a user each time that user clicked on the phish message; and
b. providing phishing and security education to a user each time that user failed to report a phish message the user received.

11. The on-line service of claim 9 wherein the difficulty levels of phish messages are determined by at least one of:
a. impersonal versus personal greetings and closings;
b. misspelling;
c. incorrect grammar;
d. improbable pretext;
e. incorrect links in the body of the phish message;
f. incorrect origin email address; and
g. unknown sender name.

12. The on-line service of claim 9 wherein the difficulty levels of phish messages are determined by message content relating to at least one of:
a. greed;
b. fear; and
c. curiosity.

13. The on-line service of claim 9 wherein the difficulty levels of phish messages are determined by the appearance of at least one of:
a. logo;
b. trademark;
c. company name; and
d. other branding used in the phish message.

14. The on-line service of claim 9 wherein the reports include information of the current difficulty level for a plurality of users over time, showing trends.

15. The on-line service of claim 9 wherein the reports are created and provided at regular time intervals, wherein the intervals are one of the group consisting of: daily, weekly, monthly, quarterly, semi-annual, and annual intervals.

16. An on-line service for increasing corporate security of an entity having at least one user capable of receiving electronic messages, the on-line service remotely conducting steps utilizing a computer program embodied on non-transitory computer readable media, the steps comprising:
a) creating a plurality of phish messages classified by a difficulty level;
b) acquiring a message address for at least one user identified to be tested;
c) assigning a level from a plurality of difficulty levels to the identified user, based on identification of the user;
d) selecting a phish message of the current difficulty level;
e) transmitting the selected phish message to the identified user's address;
f) monitoring the identified user to determine if the identified user clicked on the phish message;

g) monitoring the identified user to determine if the user reported the phish message;
h) storing an indication that the identified user correctly responded to this phish message if this user did not click on the phish message, and this user reported the phish message, and storing an indication that the identified did not correctly respond to this phish message if this user clicked on the phish message or this user did not report the phish message;
i) changing the difficulty level;
j) creating and providing a report of the users, levels and user responses, if one is due; and
k) repeating steps "d" through "i" for a plurality of repetitions.

17. The on-line service of claim 16 further comprising the step of:
   a. providing phishing and security education to a user each time that user clicked on the phish message; and
   b. providing phishing and security education to a user each time that user failed to report a phish message the user received.

18. The on-line service of claim 16 wherein the difficulty levels of phish messages are determined by at least one of:
   a. impersonal versus personal greetings and closings;
   b. misspelling;
   c. incorrect grammar;
   d. improbable pretext;
   e. incorrect links in the body of the phish message;
   f. incorrect origin email address; and
   g. unknown sender name.

19. The on-line service of claim 16 wherein the difficulty levels of phish messages are determined by message content relating to at least one of:
   a. related to greed;
   b. related to fear; and
   c. related to curiosity.

20. The on-line service of claim 16 wherein the difficulty levels of phish messages are determined by the appearance of at least one of:
   a. logo;
   b. trademark;
   c. company name; and
   d. other branding used in the phish message.

* * * * *